May 30, 1933.    T. BUCHHOLD    1,911,178
CONTROL SYSTEM
Filed July 9, 1930
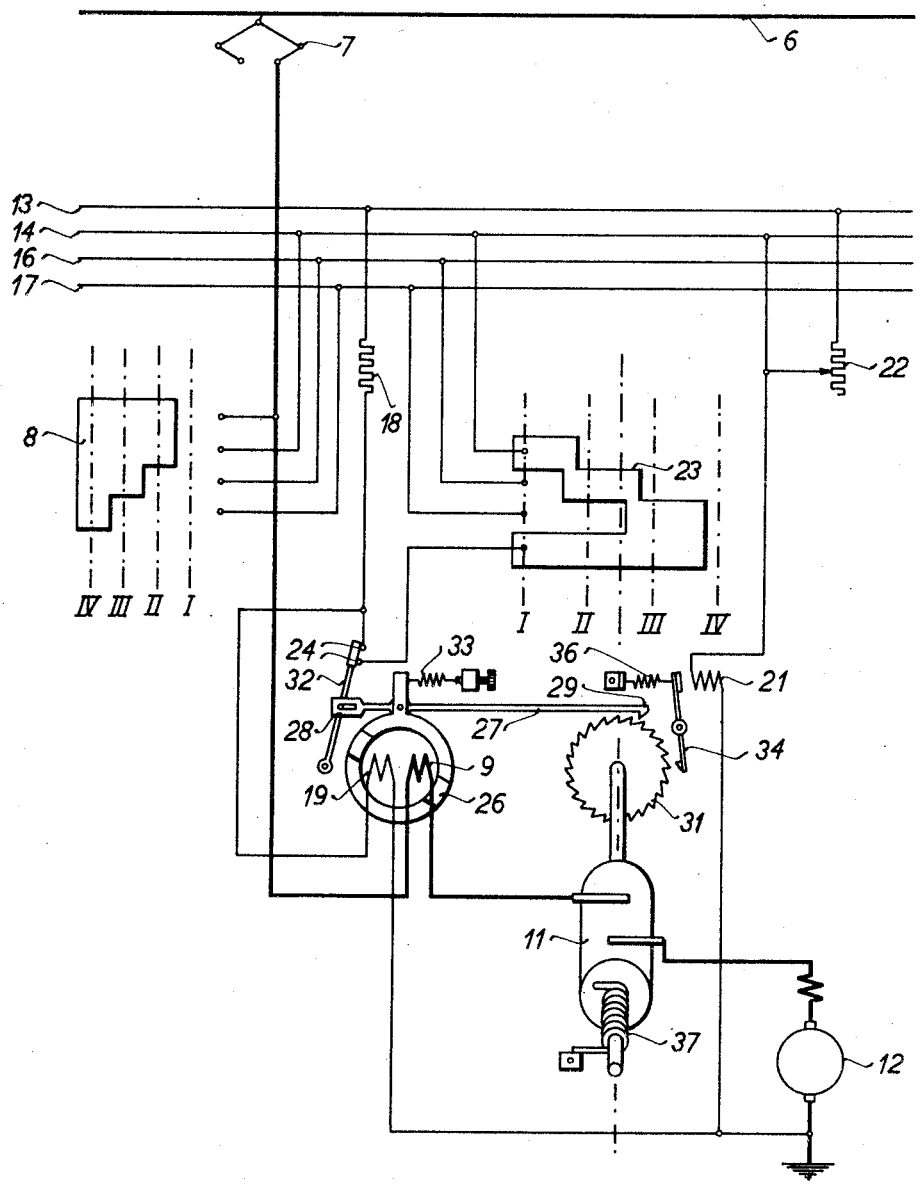
Inventor
Theodor Buchhold
By
Attorney Patented May 30, 1933

1,911,178

UNITED STATES PATENT OFFICE

THEODOR BUCHHOLD, OF MANNHEIM-NEUOSTHEIM, GERMANY, ASSIGNOR TO AKTIEN-GESELLSCHAFT BROWN, BOVERI & CIE., OF BADEN, SWITZERLAND, A JOINT-STOCK COMPANY OF SWITZERLAND

CONTROL SYSTEM

Application filed July 9, 1930, Serial No. 466,754, and in Germany July 11, 1929.

This invention relates to improvements in control systems and particularly to control systems such as are used to operate a plurality of electrical units from a common control point, as is the case in multiple unit control for railway trains.

At the present time, the operation of the driving, or traction, motors of an electrically-driven train are controlled by a controller operated by means of a pneumatic or electric motor. Such control, however, usually requires one or more special, or current limiting relays operating to control movement of the controller in dependence on the value of current flowing to the traction motors.

It is, therefore, among the objects of the present invention to provide a control system in which the current limiting relays heretofore required to control the movements of the controller are rendered unnecessary.

Another object of the invention is to provide a system in which the controller regulating the motor speed is automatically operated in response to operation of the master controller of the system.

Another object of the invention is to provide a control system in which the controller regulating the motor speed is moved in a direction corresponding to increased speed of the motor in a step-by-step movement and is reversed in a continuous movement.

Another object of the invention is to provide a control system in which operation of the master controller causes operation of a device for moving the motor controller in a forward direction and an auxiliary controller, operated by the motor controller regulates, the continuance of operation of the motor controller operating device.

Another object of the invention is to provide a control system in which a rotating magnet operable as a function of the motor circuit current, controls the movement of the motor controller.

Objects and advantages other than those above set forth will be apparent from the following descriptions when read in connection with the accompanying drawing which diagrammatically illustrates one embodiment of the present system.

Referring more particularly to the drawing by characters of reference, the reference numeral 6 designates a supply conductor or trolley line from a source of current supply (not shown) with which a current collector 7 contacts. The current collector 7 is connected with a master controller 8 and through a coil 9, to be more specifically referred to hereinafter, with a controller 11 for electrical apparatus, here shown as a motor 12 which is grounded, as is usual for the motors of electric trains. The master controller 8 is provided, for purposes of control, as is usual, with portions whereby different circuits may be established in positions II, III, IV.

The several car units of the electric trains are connected by a control line comprising the several conductors 13, 14, 16, 17 which are supplied with current from the trolley line 6 through the master controller 8. The control line 13 is connected through a resistance 18 and through a coil 19, to be more specifically referred to hereinafter, which is connected to ground and from ground through a coil 21, to be more specifically referred to hereinafter, with the control line 14. A variable resistance 22 is connected across the control line 13 and 14 for a purpose which will appear hereinafter. Control lines 14, 16 and 17 are connected through an auxiliary controller 23, on the shaft of the motor controller 11, with a pair of contacts 24 by which the auxiliary controller 23 may be connected with the coil 19. The auxiliary controller 23 is formed with a plurality of contact or control positions I, II, III and IV corresponding to those of the master controller 8. The coils 9 and 19 are portions of a magnet having a rotating armature 26 to which is connected an arm 27 formed at the one end thereof as a slotted head 28 and formed at the other end thereof with a pawl head 29 engageable in the notches of a ratchet wheel 31 on the shaft of a motor controller 11.

The slotted head 28 of the arm 27 engages a pin on a pivoted contact member 32 to make or break contact at 24 in response to movement of the armature 26. The armature 26 is held under the tension of an adjustable spring 33 tending to cause clockwise rotation of the armature.

A pawl 34 is pivoted adjacent the ratchet wheel 31 and is under the action of a spring 36 tending to disengage the pawl from the wheel and is also under the action of the coil 21 which tends to cause the pawl to engage the wheel when the coil is energized, thereby preventing clockwise movement of the wheel and the motor controller 11 connected therewith.

A torsion spring 37 is arranged about the shaft of the motor controller 11 for the purpose of causing clockwise rotation of the same to the zero position thereof in one continuous movement when the pawl 34 is disengaged by energization of the coil 21.

The rotary magnet shown as comprising the coils 9 and 19 and the armature 26 may be of the character disclosed in United States Letters Patent No. 1,764,658, granted to Josef Stoecklin, which structure is herein modified to provide a rotating armature and is provided with two coils as required herein, or the magnet may be of any suitable structure capable of producing a sufficiently large torque for a small angular movement.

In operation it is desired that the motor controller be rotated in a counter-clockwise direction by a step-by-step movement to increase the speed of the motor 12 and that the controller be returned to the zero position thereof by a single continuous movement when the master controller is returned to its zero position.

Movement of the master controller 8 into its position II from its zero position I completes a circuit from the trolley line 6 over the current collector 7, the master controller 8, the control line 14, the auxiliary controller 23, the contacts 24 which are closed, as shown in the drawing, and coil 19 to ground.

The coil 19 causes counter-clockwise movement of the armature 26 which causes the arm 27 to engage the ratchet wheel 31 and move the wheel one notch, in a counter-clockwise direction, against the tension of the springs 33 and 37. Movement of the arm 27 likewise causes rotation of contact member 32 which opens contacts 24. A circuit is also present from the trolley line 6 over the current collector 7, the master controller 8, the control line 14, the resistance 22, the control line 13, the resistance 18 and the coil 19 to ground. The magnet armature is then moved in a clockwise direction closing contacts 24 under the action of the spring 33 because the current in coil 19, when in circuit with resistance 22, is not sufficiently great to hold the armature 26 in the above position and the above cycle of movements of the magnet is repeated until the auxiliary controller 23 is moved to the position at which it breaks the circuit with the control line 14. A further circuit is also present from the trolley line 6 over the current collector 7, the master controller 8, the control line 14 and the coil 21 to ground. The coil 21 being energized causes pawl 34 to engage the wheel 31 and prevents return of the motor controller 11 to the zero position under the action of the spring 37. The coil 21 is deenergized only when the master controller is returned to its zero position I so that the spring 36 may be caused disengagement of the pawl 34 from the wheel 31, thereby permitting spring 37 to return the motor controller 11 to its zero position.

When the master controller 8 is moved to position III, the circuit is completed from the trolley line 6 over the current collector 7, the master controller 8, the control line 16, the auxiliary controller 23, the contacts 24 and the coil 19 to ground. Armature 26 moves counter-clockwise, moving ratchet wheel 31 and opening contacts 24. As long as the current in the coil 9 is above a certain value, the armature 26 will remain in its clockwise attracted position.

When the current in the coil 9 drops below the predetermined value dependent on the current in the coil 19 over the resistance 22, the armature 26 will be released and the above cycle of operation will continue until the auxiliary controller 23 has reached its position III. The circuits obtainable when the master controller is moved to position IV are similar to those above described with respect to movement of the master controller 8 to the position III thereof.

It will thus be seen that the present invention provides a system for controlling the operation of a plurality of electric units from a common control point, which system does not require the low current relays heretofore required, and in which the master controller, through the control system, operates the motor controller in a step-by-step movement and permits reversal of the same in one continuous movement. The present system also provides for the operation of the motor controller under the control of the master controller and an auxiliary controller by a rotating magnet of high torque at small angles as a function of the current.

Although but one embodiment of the present invention has been illustrated and described, it will be apparent to those skilled in the art that various changes and modifications may be made therein without departing from the spirit of the invention or from the scope of the appended claims.

The invention claimed is:

1. In an electric motor control system, a motor, a source of electric current, a controller switch movable step-by-step to a plurality of positions and effective thereat to connect the said current with the said motor to cause operation of the latter, the said controller comprising a contact member and a toothed device, a pawl disposed to engage said device to move the said member step-by-step, and means for actuating said pawl comprising an operating means and a holding means, the said holding means being operative in dependence upon the flow of said current to the said motor and opposing said operating means to thereby prevent movement of the said pawl during periods of flow of said current to the motor in excess of a predetermined value.

2. In an electric motor control system, a motor, a source of electric current, a controller switch movable step-by-step to a plurality of positions and effective thereat to connect the said current with the said motor to cause operation of the latter, the said controller comprising a contact member and a toothed device, the pawl disposed to engage the said device to move the said member step-by-step, and an electro-magnet for actuating the said pawl comprising an operating winding and a holding winding, the said holding winding being operative in dependence upon the flow of said current to the said motor and effective to prevent movement of said pawl during periods of such said flow of current in excess of a predetermined value.

3. In an electric motor control system, a motor, a source of electric current, a controller switch movable step-by-step to a plurality of positions and effective thereat to connect the said current with the motor, the said controller comprising a contact member and a toothed device, an actuating pawl and a holding pawl, the said actuating pawl being disposed to engage the said device to cause said step-by-step movements of the said controller, and the said holder pawl being disposed to engage said device to hold the same in any one of said plurality of positions, an electro-magnet for actuating the first said pawl comprising an operating winding and a holding winding, the said holding winding being operative in dependence upon the flow of said current to the said motor and effective to prevent movement of the first said pawl during periods of such said flow of current in excess of a predetermined value, an electro-magnet operative upon energization thereof to cause said holding pawl to retain the said contact member in any one of its actuated positions, and means for connecting the said current with the last said electro-magnet to cause energization thereof.

4. In an electric motor control system, a motor, a source of electric current, a controller switch comprising a contact member and a toothed device, a driving pawl operative to engage the said device to actuate the said member step-by-step to a plurality of switching positions to effect connection of said current with the said motor to cause operation of the latter, a holding pawl operative to engage the said device to retain the said member in any of its said plurality of switching positions, an electro-magnet operative to actuate the first said pawl to cause said step-by-step movements of the said member, the said magnet comprising an operating winding and a holding winding, the said holding winding being operative in dependence upon the flow of current to the said motor and effective to prevent movement of the first said pawl during periods of such said flow of said current in excess of a predetermined value, an electro-magnet having a winding operative upon energization thereof to cause said holding pawl to retain the said member in any one of its said switching positions when moved thereto, means for effecting connection of said current with the operating winding of the first said magnet and the winding of second said magnet to effect energization thereof, and means operative to return the said member to its normal position in a continuous movement upon de-energization of the winding of the second said magnet.

In testimony whereof I have hereunto subscribed my name this 27th day of June, A. D. 1930.

THEODOR BUCHHOLD.